United States Patent
Barnett

[19]

[11] Patent Number: 6,035,199

[45] Date of Patent: Mar. 7, 2000

[54] METHOD AND APPARATUS FOR PERFORMING A HANDOFF IN A WIRELESS COMMUNICATION SYSTEM

[75] Inventor: Charles A. Barnett, Sterling, Va.

[73] Assignee: Hughes Electronics Corporation, El Segundo, Calif.

[21] Appl. No.: 08/835,593

[22] Filed: Apr. 10, 1997

[51] Int. Cl.[7] .................................................... H04Q 7/20
[52] U.S. Cl. .......................... 455/448; 455/436; 455/438; 370/331
[58] Field of Search ...................... 455/436, 439, 455/440, 443, 444, 434, 438, 448, 525; 370/331, 332, 344, 350, 506, 516

[56] References Cited

U.S. PATENT DOCUMENTS

| | | | |
|---|---|---|---|
| 5,175,867 | 12/1992 | Wejke et al. | 455/439 |
| 5,355,515 | 10/1994 | Sicher | 455/438 |
| 5,542,098 | 7/1996 | Bonta | 455/434 |
| 5,640,676 | 6/1997 | Garncarz et al. | 455/436 |
| 5,640,679 | 6/1997 | Lundqvist et al. | 455/525 |
| 5,711,003 | 1/1998 | Dupuy | 455/436 |
| 5,802,046 | 9/1998 | Scott | 370/280 |
| 5,802,473 | 9/1998 | Rutledge et al. | 455/446 |
| 5,818,829 | 10/1998 | Raith et al. | 370/347 |

*Primary Examiner*—Reinhard J. Eisenzopf
*Assistant Examiner*—Charles N. Appiah
*Attorney, Agent, or Firm*—Michael W. Sales; John T. Whelan

[57] ABSTRACT

The present invention relates to an apparatus and method for performing a handoff in wireless communication system. The method includes the steps of establishing communication between a mobile subscriber and a serving cell, determining whether a target cell and the serving cell are collocated, sending a normal burst handoff command to a mobile subscriber, sending a normal burst from the mobile subscriber to the target cell including a time offset, and establishing communication between the mobile subscriber and the target cell. The apparatus relates to a wireless system including a serving cell and a target cell in communication with a mobile subscriber. The mobile subscriber is sent a normal burst handoff, including an instruction to the mobile subscriber to transmit in normal bursts and to main current alignment, when the target cell overlaps the serving cell.

45 Claims, 2 Drawing Sheets

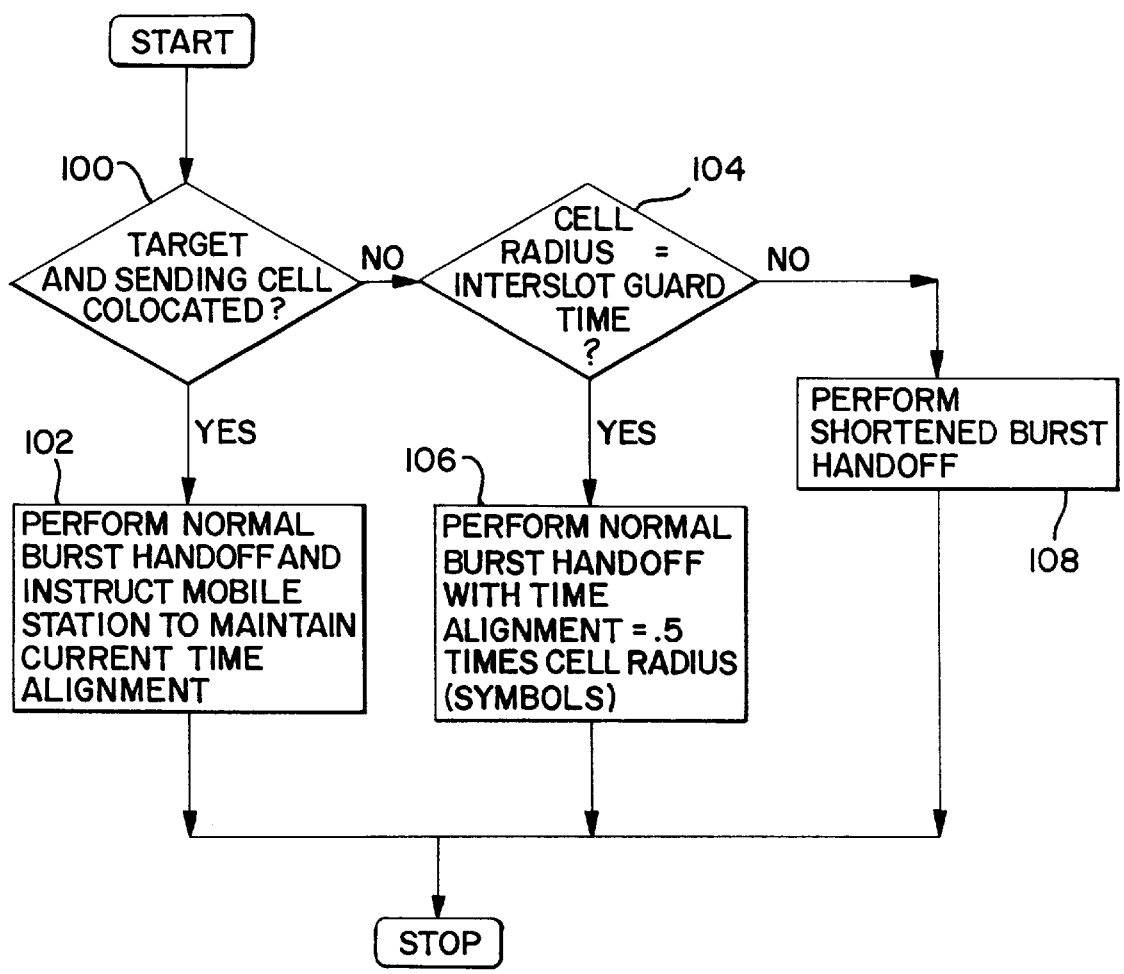

METHOD AND APPARATUS FOR PERFORMING A HANDOFF IN A WIRELESS COMMUNICATION SYSTEM

BACKGROUND OF THE INVENTION

The present invention relates generally to wireless communications, and more particularly to a method and apparatus for effecting a handoff in a cellular communication system.

Cellular communications systems usually include several base transceiver stations that transmit and receive channels of information throughout a predetermined area referred to as a cell. The base transceiver stations are typically arranged to provide continuous service to mobile subscribers throughout a particular geographic region.

When a mobile subscriber is engaged in a call, the mobile subscriber will frequently approach the boundary between two cells. As the mobile subscriber nears the boundary of the serving cell, the signal strength of the traffic channel from the mobile subscriber will begin to fall in the serving cell. When the signal strength falls below a predetermined threshold value, the base transceiver station of the serving cell requests the base station controller to determine whether the mobile signal equals or exceeds a predetermined threshold value in one of the neighboring cells. If a neighboring base transceiver station detects an adequate signal level of the mobile subscriber, a handoff will be initiated in order to transfer the call to a selected traffic channel of the neighboring cell.

In conventional digital TDMA cellular systems, a handoff of a mobile subscriber usually requires the base transceiver station of the serving cell to transmit a signal to the mobile subscriber commanding it to transmit several commands in shortened bursts to a large neighboring cell. The shortened bursts contain information that allows the neighboring cell to determine initial synchronization including the initial timing offset. However, the transmission of the shortened bursts adds to the communication overhead of the system by consuming valuable transmission time. In particular, the time spent sending the shortened bursts over the communication channel could be used to transmit other information, such as telephony data. In addition, the transmission of shortened bursts may result in queuing delays and system congestion, causing significant speech interruption. These problems are magnified when one considers that typical cellular systems usually service numerous mobile subscribers.

Accordingly, there is a need for an improved apparatus and method for performing a handoff in a digital TDMA wireless communication system. It would be desirable for the apparatus and method to decrease the amount of time needed to perform a handoff. It would also be beneficial to provide an apparatus and method that can reduce the amount of transmissions needed during a handoff.

SUMMARY OF THE INVENTION

The present invention achieves the above benefits by providing an improved apparatus and method for effecting a handoff in a wireless communication system. The apparatus and method of the present invention reduce the number of transmissions that are needed during a handoff. The apparatus and method of the present invention also decrease the amount of time needed to perform a handoff, thereby allowing the wireless communication system to perform more efficiently. In one aspect of the invention, a method of performing a handoff in a wireless communication system is provided. The method includes the steps of establishing communication in a serving cell, determining whether a target cell and the serving cell are collocated, sending a normal burst handoff command including timing offset, sending normal bursts to the target cell and establishing communication in the target cell.

In another aspect of the invention, another method of performing a handoff in a mobile communication system is provided. The method includes the steps of establishing a communication channel in a serving cell, determining the radius of a target cell, sending a normal burst handoff including timing offset, sending a normal burst to the target cell including a time offset, and establishing a communication channel in the target cell.

Another aspect of the invention relates to a wireless communication network that includes a serving cell and a target cell in communication with a mobile subscriber. The mobile subscriber is sent a normal burst handoff, including an instruction to the mobile subscriber to transmit in normal bursts and to maintain current alignment, when the target cell overlaps the serving cell.

A further aspect of the invention relates to a wireless communication network that includes a serving cell and a target cell in communication with a mobile subscriber. The mobile subscriber is sent a normal burst handoff, including an instruction to the mobile subscriber to transmit in normal bursts and with time alignment offset corresponding to half the radius of the target cell, when the radius of the target is less than an inter-slot guard time.

It is to be understood that both the foregoing general description and the following detailed description are exemplary and explanatory and are intended to provide further explanation of the invention as claimed.

The invention, together with further objects and attendant advantages, will best be understood by reference to the following detailed description of the presently preferred embodiment of the invention, taken in conjunction with the accompanying drawings.

BRIEF DESCRIPTION OF THE DRAWINGS

FIG. 4 is a flow chart of a handoff in accordance with the present invention.

DETAILED DESCRIPTION OF THE PREFERRED EMBODIMENT

Figure 1:
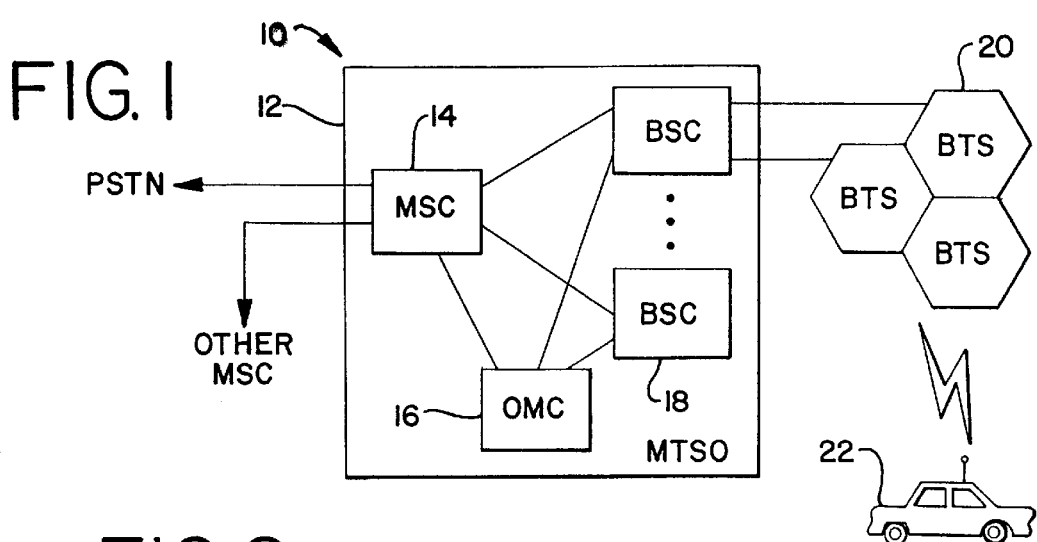
FIG. 1 is a block diagram of a digital cellular network.

Referring now to the drawings, and more particularly to FIG. 1, a preferred embodiment of a cellular network 10 is illustrated. The cellular network 10 may be utilized to implement the handoff method and apparatus of the present invention. The cellular network 10 allows normal bursts to be sent by a mobile subscriber during a handoff. Normal burst handoffs may be performed when the serving cell and target all are collocated or when the target cell radius is less than that interslot guard time. Normal burst handoffs preferably decrease the amount of time needed to perform a handoff, thereby allowing the cellular network 10 to perform more efficiently.

In a preferred embodiment, the cellular network 10 includes at least one base transceiver station (BTS) 20, at least one mobile subscriber 22, and a mobile telephone switching office (MTSO) 12. The MTSO 12 includes a mobile switching center (MSC) 14, an operations and maintenance center (OMC) 16, and a plurality of base station controllers (BSCs) 18. The MTSO 12 is in communication with a terrestrial telephony carrier, such as the public switched telephone network (PSTN), and may also communicate with satellite systems and other mobile switching centers.

The MSC 14 is in communication with the OMC 16, and is also in communication with at least one BSC 18. The BSC 18 is connected through a communication channel to one or more of the base transceiver stations (BTS) 20. Each BTS 20 includes an antenna (not shown) and defines an individual cell of the cellular network 10. Each BTS 20 includes hardware and software required to communicate over the channels of the cellular system 10. Each BTS 20 also includes a plurality of individual scanning receivers for scanning selected traffic channels and digital multiplex equipment for transmission of audio traffic to its associated BSC 18.

A mobile subscriber 22 may communicate over a control channel with a BTS 20 of a particular cell in which it is located. The mobile subscriber 22 is preferably either a hand held phone or a vehicle mounted unit. It is also contemplated that the mobile subscriber 22 may include fixed terminals. The mobile subscriber 22 may also include a scanning receiver for scanning selected channels of the serving and neighboring cell. Preferably, the serving and neighboring cells have a coverage radius between 12 to 50 KM.

A call may be originated from the mobile subscriber 22 by transmitting initialization data over the control channel assigned to the BTS 20 serving the mobile subscriber 22. Preferably, the control channel signal is received over a time slot within a predetermined frequency assigned to the cell. From the BTS 20, the call is routed to the BSC 18, and then to the MSC 14. From the MSC 14, the call is routed outside of the MTSO 12 to either another MSC or the PSTN. Thereafter, a communication channel is established through the entire digital cellular network 10, and the mobile subscriber 22 may communicate over the established communication channel.

The mobile subscriber 22 may also receive calls originating from a terrestrial facility, such as the PSTN or another MSC, by connecting the call through the system 10 at the MSC 14. From the MSC 14, the call is routed to one of the BSCs 18. The BSC 18 then sends a message to the mobile subscriber 22 via the appropriate BTS 20 to announce the incoming call. After the mobile subscriber 22 responds to the page from the BTS 20, a communication channel is established.

Figure 2:
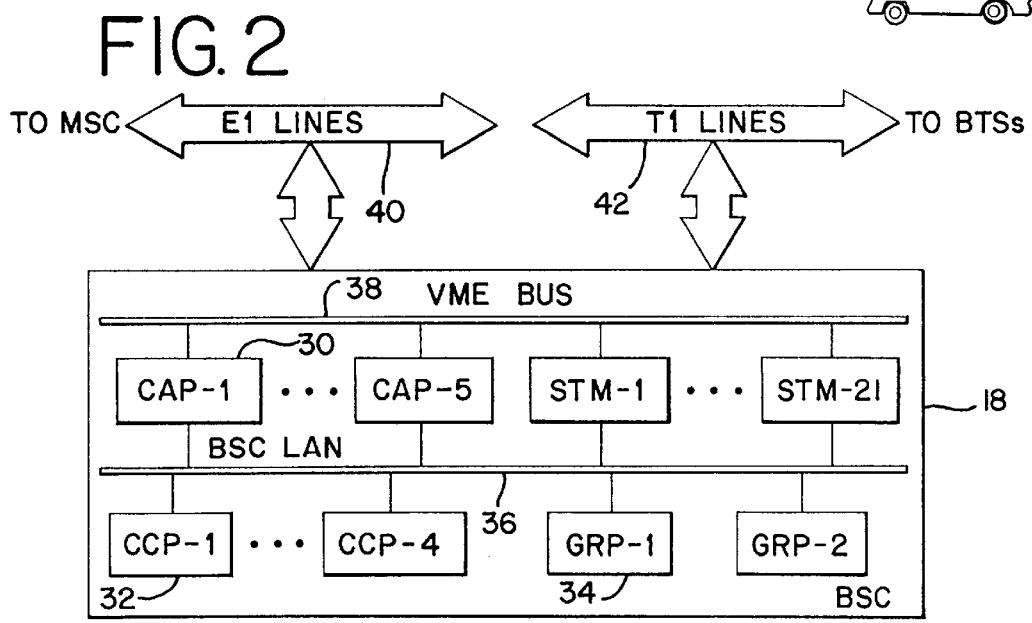
FIG. 2 is a block diagram of the base station controller of FIG. 1.

Referring to FIG. 2, a preferred component layout for the BSC 18 is illustrated. The BSC 18 preferably implements audio compression/decompression and handles call establishment, disconnect, and handoff procedures. The BSC 18 also allocates system resources of the BTS 20 associated with a particular BSC 18. The BSC 18 communicates with the MSC 14 over E1 transmission lines 40, and communicates with the BTS 20 over T1 transmission lines 42. The BSC 18 also communicates with the MSC 14 for effecting a handoff from one BTS 18 to another BTS 18.

Preferably, the BSC 18 has several processors including a global resource processor (GRP) 34, a call control processor (CCP) 32, and a channel access processor (CAP) 30. The BSC 18 also includes a BSC local area network (LAN) 36 and a VME bus 38. The VME bus 38 is used to communicate between the various CAPs 30, while the BSC LAN 36 allows communication between the CCPs 32.

The CAP 30, CCP 32, and GRP 34 shown in FIG. 2 are preferably 32 bit microprocessors, such as an Intel 960. The processors (30, 32, and 34) are preferably operated with a multi-tasking software operating system such as UNIX or the VX WORKS operating system, available from Wind River Systems. The processors (30, 32, and 34) are also usually programmed with application software and communication software. Preferably, the software is written in C language or another conventional high level programming language. Each of the processors (30, 32, and 34) communicates with the other processors using either the BSC LAN 36 or the VME bus 38. Preferably, the processors (30, 32, and 34) communicate with each other using a network configuration and communication techniques well-known in the art.

Calls originating from the mobile subscriber 22 are received over the T1 line 42 and processed by the GRP 34. The GRP 34 then determines, based on loading conditions, which CCP 32 should handle the call. The call is then handed off to the selected CCP 32 assigned to the call. The CCP 32 then determines which CAP 30 should be used. In the case of a call originating from the PSTN or another MSC, the call is received by the MSC 14 and is then routed to a GRP 34 over an E1 line 40. The GRP 34 allocates a CCP 32, which then allocates a CAP 30.

Figure 3:
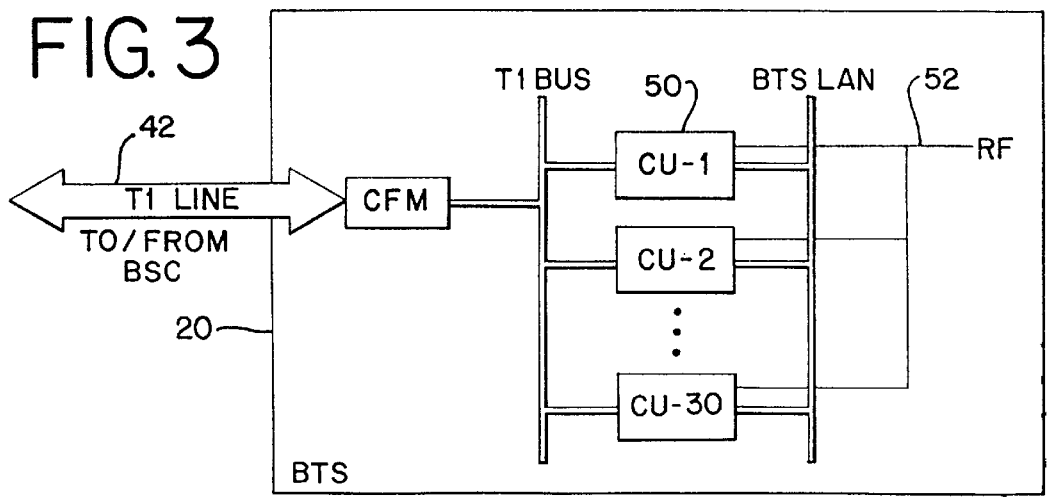
FIG. 3 is a block diagram of the base transceiver station of FIG. 2.

Referring to FIG. 3, a block diagram of a preferred component layout for the BTS 20 is illustrated. The BTS 20 communicates with the BSC 18 over T1 communication lines 42. A channel unit (CU) 50 receives data from the T1 lines 42 and generates a signal to be sent over a communication line 52. The communication line 52 is used to communicate with the mobile subscriber 22 in a cell (not shown).

The CU 50 is preferably either an analog channel unit, a dual mode channel unit, or a digital channel unit. Each CU 50 contains a plurality of communication channels available for transmissions. These channels may be analog control channels, analog traffic channels, digital traffic channels, analog scanning receiver channels, digital scanning receiver channels, or digital control channels. The control channels are used to communicate between the BTS 20 and the mobile unit 22 before the mobile unit 22 has been assigned a voice channel for communication. An analog traffic channel may be used for voice communication between the BTS 20 and the mobile subscriber 22. Each traffic channel is associated with a specific predefined frequency used for radio transmission over the communication link 52. The allocation of frequencies to traffic channels is defined in detail by U.S. Cellular Standard IS-54. Alternatively, in a digital communication system, a digital traffic channel may be used instead of the analog traffic channel.

Each CU 50 includes its own processor, such as an Intel 960 32-bit microprocessor unit, along with a hardware circuit for transmitting information over each of the channels. Each CU 50 communicates with other CUs 50 in the same BTS 20 over the BTS LAN 36.

In a preferred embodiment, the mobile subscriber 22 employs a time division multiple access (TDMA) method of communicating digital information to the BTS 20. The formatted information transmitted from the mobile subscriber 22 to the BTS 20 is arranged in frames having time slots. Preferably, there are six time slots. The mobile subscriber 22 broadcasts information onto one of the time slots in transmission bursts. The transmission bursts are synchronized to correspond with the appropriate time slot reserved for the particular transmission. The transmission bursts are separated by an inter-burst guard time to avoid interference between bursts.

Referring to FIG. 4, a preferred embodiment of a handoff scheme for a cellular communication system is shown. When a mobile subscriber 22 is engaged in a call, it will frequently move out of the coverage area of the base transceiver station with which it is in communication. Unless the call is handed off to another cell, it will be dropped.

The BSC 18 determines when a handoff of a mobile subscriber 22 may be appropriate. The BTS 20 is preferably equipped with a signal strength receiver that can measure signal strength. The signal strength of the mobile subscriber 22 is continuously monitored at the BTS 20 by the BCS 18. When the signal falls below a predetermined threshold value, the BSC 18 requests one or more neighboring or target BTS 20 to determine whether the level of the mobile subscriber 22 is above or equal to a predetermined threshold value. If the signal is not equal to or greater than the predetermined value in a neighboring BTS 20, the communication transfer request will be canceled. If the signal is greater than the predetermined threshold value, a response is sent to the BCS 18 to indicate that a target cell has been located. After the BTS 20 of the target cell responds, the BSC 18 selects the BTS 20 of the target cell for a handoff and a channel is set up at the target BTS 20.

The BSC 18 will also determine if the target cell and the serving cell are collocated in block 100. Preferably, each cell in the cellular system 10 is assigned to a site in a database and the BSC 18 accesses the database to determine if the serving cell and target cell are at the same site. Two cells are at the same site if they are sectioned or overlaid cells. The database could be a network management system capable of downloading information to the BSC 18. If the target cell and serving cell are in the same site (i.e. collocated), the serving BTS 20 sends a normal burst handoff command instructing the mobile subscriber 22 to send normal bursts as represented by block 102. The mobile subscriber 22 then tunes to the channel of the target BTS 20 and transmits normal bursts including new or current time alignment (i.e. timing offset). The transmissions of the mobile subscriber 22 may be allowed to drift, but the target cell will adjust the frame timing of the transmitted channel by sending a time alignment message to the mobile subscriber 22.

If the target cell and serving (i.e. current cell) cell are not collated, the BSC 18 determines in block 104 whether the radius of the target cell, represented by the amount of time it takes to transmit a signal over the radius, is less than or equal to the inter-slot guard time. Preferably, the cell radius is included in the cell configuration stored on the database and is converted into the corresponding number of symbols. The number of symbols represents the time to transmit a signal over a certain distance. If the radius of the target cell, as represented by the number of symbols, is less than or equal to the inter-slot guard time, the mobile subscriber 22 is sent a normal burst handoff request as represented in block 106. Preferably, the serving cell commands the mobile subscriber to send normal bursts at a timing offset corresponding to half of the inter-slot guard time. A normal burst handoff may also be sent when the radius of the target cell is within four (4) symbols. When a normal burst handoff is performed, the correct time alignment offset is computed within a few frames at the BTS 20 or BSC 18, and the mobile subscriber 22 is instructed to correct its time alignment offset. If a normal burst handoff is not performed based on the criteria discussed above, a shortened burst handoff is performed as represented in block 108.

Although the present invention has been described in detail by way of illustration and example, it should be understood that a wide range of changes and modifications can be made to the preferred embodiment described above without departing in any way from the scope and spirit of the invention. Furthermore, the described embodiments are to be considered in all respects only as illustrative and not restrictive, and the scope of the invention is, therefore, indicated by the appended claims rather than the foregoing description. All changes that come within the meaning and range of equivalency of the claims are to be embraced within their scope.

What is claimed is:

1. A method of performing a handoff in a wireless communication system comprising the steps of:

establishing communication in a serving cell;

determining whether a target cell and the serving cell are collocated and unsynchronized;

estimating an initial timing offset corresponding to a time which is less than or equal to half of an inter-slot guard time;

sending a normal burst handoff command including the estimated initial timing offset;

sending normal bursts to the target cell; and establishing communication in the target cell.

2. The method of claim 1 wherein the handoff command comprises an instruction to transmit normal bursts.

3. The method of claim 1 wherein the time offset comprises current time alignment.

4. The method of claim 1 wherein the step of determining collocation comprises determining whether the target cell and serving cell are at a same site.

5. A method of performing a handoff in a wireless communication system comprising the steps of:

establishing communication in a serving cell;

determining whether a target cell and the serving cell are collocated;

sending a normal burst handoff command including timing offset; sending normal bursts to the target cell; and establishing communication in the target cell; wherein the steps of determining collocation comprises:

assigning the target cell to a site in a database;

assigning the serving cell to a site in a database;

retrieving the site of the target cell;

retrieving the site of the serving cell; and comparing the site of the serving cell and the target cell.

6. The method of claim 1 wherein the serving cell and the target cell comprise medium size cells.

7. The method of claim 1 wherein the target cell and serving cell comprise large cells.

8. The method of claim 1 further comprising setting up a channel in the target cell.

9. The method of claim 1 wherein the normal burst includes a current time alignment.

10. The method of claim 1 further comprising transferring the communication to establish communication between the mobile subscriber and the target cell.

11. The method of claim 5 wherein the handoff command comprises an instruction to transmit normal bursts.

12. The method of claim 5 wherein the time offset comprises current time alignment.

13. The method of claim 5 wherein the step of determining collocation comprises determining whether the target cell and serving cell are at a same site.

14. The method of claim 5 wherein the serving cell and the target cell comprise medium size cells.

15. The method of claim 5 wherein the target cell and serving cell comprise large cells.

16. The method of claim 5 further comprising setting up a channel in the target cell.

17. The method of claim 5 wherein the normal burst includes a current time alignment.

18. The method of claim 5 further comprising transferring the communication to establish communication between the mobile subscriber and the target cell.

19. A method of performing a handoff in a mobile communication system comprising the steps of:
   establishing a communication channel in a serving cell;
   determining the radius of a target cell;
   estimating an initial timing offset corresponding to a time which is less than or equal to half of an inter-slot guard time;
   sending a normal burst handoff including the estimated initial timing offset;
   sending a normal burst to the target cell including a time offset; and
   establishing a communication channel in the target cell.

20. The method of claim 19 wherein the timing offset comprises half of an interslot guard time.

21. The method of claim 19 further comprising the step of determining whether the target cell radius is less than an inter-slot guard time.

22. The method of claim 19 further comprising sending a normal burst from the mobile subscriber when the target radius corresponds to less than four symbols of an inter-slot guard time.

23. The method of claim 19 wherein the normal burst handoff to a mobile subscriber is sent when a radius of a target cell is less than an inter-slot guard time and the target cell and the serving cell are not collocated.

24. The method of claim 19 further comprising the step of setting up a channel in the target cell.

25. The method of claim 19 further comprising the step of transmitting normal bursts including a time alignment of half the radius of the target cell.

26. The method of claim 19 further comprising the step of transferring the communication to establish communication between the mobile subscriber and the target cell.

27. The method of claim 5 further comprising sending a normal burst from the mobile subscriber when the target radius corresponds to less than four symbols of an inter-slot guard time.

28. A wireless communication network comprising:
   a serving cell communicating with a mobile subscriber;
   a target cell communicating with the mobile subscriber; and
   a normal burst handoff sent to the mobile subscriber when the target cell overlaps the serving cell, the normal burst handoff including an instruction to transmit in normal burst and an estimated initial timing offset corresponding to a time which is less than or equal to half of an inter-slot guard time.

29. The wireless communication network of claim 28 wherein the serving cell is between 12 to 80 km.

30. The wireless communication network of claim 28 wherein the target cell is between 12 to 80 km.

31. A wireless communication network comprising:
   a serving cell communicating with a mobile subscriber;
   a target cell communicating with the mobile subscriber; and
   a normal burst handoff including an instruction to transmit in normal bursts and with time alignment offset corresponding to half the radius of the target cell, the normal burst handoff sent to the mobile subscriber when the radius of the target is less than an inter-slot guard time.

32. The wireless communication network of claim 31 wherein the serving cell is between 12 to 80 km.

33. The wireless communication network of claim 31 wherein the target cell is between 12 to 80 km.

34. A method in a communication system comprising:
   transmitting a handoff command including an estimated initial timing offset to a mobile subscriber when it is determined that a handoff should be performed between a serving cell and a target cell which are not collocated, the handoff command instructing the mobile subscriber to initiate a normal burst to the target cell in accordance with the estimated initial timing offset, the estimated initial timing offset corresponding to a time which is less than or equal to half of an inter-slot guard time.

35. The method according to claim 34, wherein the estimated initial timing offset corresponds to half of the inter-slot guard time.

36. The method according to claim 34, wherein the estimated initial timing offset corresponds to half of a radius of the target cell.

37. A method in a communication system comprising the steps of:
   receiving a handoff command including an estimated initial timing offset when it is determined that a handoff should be performed between a serving cell and a target cell which are not collocated; and
   initiating a normal burst to the target cell in accordance with the estimated initial timing offset in response to the handoff command, the estimated initial timing offset corresponding to a time which is less than or equal to half of an inter-slot guard time.

38. The method according to claim 37, wherein the estimated initial timing offset corresponds to half of the inter-slot guard time.

39. The method according to claim 37, wherein the estimated initial timing offset corresponds to half of a radius of the target cell.

40. A communication network comprising:
   a transmitting device for transmitting a handoff command including an estimated initial timing offset to a mobile subscriber when it is determined that a handoff should be performed between a serving cell and a target cell which are not collocated, the handoff command instructing the mobile subscriber to initiate a normal burst to the target cell in accordance with the estimated initial timing offset, the estimated initial timing offset corresponding to a time which is less than or equal to half of an inter-slot guard time.

41. The communication network according to claim 40, wherein the estimated initial timing offset corresponds to half of the inter-slot guard time.

42. The communication network according to claim 40, wherein the estimated initial timing offset corresponds to half of a radius of the target cell.

43. A communication network comprising:
   receiving means for receiving a handoff command including an estimated initial timing offset when it is determined that a handoff should be performed between a serving cell and a target cell which are not collocated; and
   transmitting means for initiating a normal burst to the target cell in accordance with the estimated initial timing offset in response to the handoff command, the estimated initial timing offset corresponding to a time which is less than or equal to half of an inter-slot guard time.

44. The method according to claim 43, wherein the estimated initial timing offset corresponds to half of the inter-slot guard time.

45. The method according to claim 43, wherein the estimated initial timing offset corresponds to half of a radius of the target cell.

* * * * *